(12) United States Patent
Ali

(10) Patent No.: US 7,567,945 B2
(45) Date of Patent: Jul. 28, 2009

(54) AGGREGATION-SPECIFIC CONFIDENCE INTERVALS FOR FACT SET QUERIES

(75) Inventor: Kamal Mahmood Ali, Campbell, CA (US)

(73) Assignee: Yahoo! Inc., Sunnyvale, CA (US)

( * ) Notice: Subject to any disclaimer, the term of this patent is extended or adjusted under 35 U.S.C. 154(b) by 439 days.

(21) Appl. No.: 11/427,722

(22) Filed: Jun. 29, 2006

(65) Prior Publication Data

US 2008/0005052 A1 Jan. 3, 2008

(51) Int. Cl.
G06N 5/00 (2006.01)

(52) U.S. Cl. .................. 706/45; 706/12; 707/2

(58) Field of Classification Search .......... 706/45, 706/12; 707/2
See application file for complete search history.

(56) References Cited

OTHER PUBLICATIONS

Kamal Ali ("Pushing Uniform Sampling below Join in Query Trees" 2007).*
Chaudhuri et al ("On Random Sampling over Joins" 1999).*
Haas et al ("A Bi-level Bernoulli Scheme for database Sampling" 2004).*
Luo et al ("A scalable hash ripple join algorithm" 2002).*
Chaudhuri et al., "Overcoming Limitations of Sampling for Aggregation Queries", 17th International Conference on Data Engineering (ICDE'01) p. 0534.
Duffield et al., "Priority sampling estimating arbitrary subset sums", arXiv:cs.DS/0509026 v1 Sep. 9, 2005., http://www.fmf.uni-lj.si/~cabello/courses/probCS/lectures/dlt-sampling.pdf, 26 pages.
Hellerstein et al., "Online Aggregation", In Proc. ACMSIGMOD International Conference on Management of Data, Tucson, May 1997. http://citeseer.ist.psu.edu/hellerstein97online.html, 12 pages.
Peter J. Haas, "Speeding Up DB2 UDB Using Sampling", http://www.almaden.ibm.com/cs/people/peterh/idug2003.pdf, Research Staff Member/IBM Almaden Research Center,Session: G11, Thursday, May 22, 2003 / 4:00pm, 28 pages.
Babcock et al., "Dynamic Sample Selection for Approximate Query Processing", http://www.stanford.edu/~babcock/papers/sampling.pdf, International Conference on Management of Data, Proceedings of the 2003 ACM SIGMOD international conference on Management of data, San Diego, California,pp. 539-550, 2003 ISBN:1-58113-634-X.
Peter J. Haas, "Speeding Up DB2 UDB Using Sampling", Presentation, IBM Data Management Technical Conference, Anaheim, CA, Sep. 9-13, 2002, 51 pages.
Peter J. Haas, "Speeding up DB2 UDB Using Sampling", The IDUG Solutions Journal, vol. 10, No. 2 (Sep. 2003), 6 pages.

* cited by examiner

*Primary Examiner*—David R Vincent
*Assistant Examiner*—Lut Wong
(74) *Attorney, Agent, or Firm*—Beyer Law Group LLP

(57) ABSTRACT

An aggregation operation is performed on a subset of facts sampled from a full structured collection of facts, to determine an aggregation result. Based on the determined aggregation result and on an indication of characteristics of the sampled subset of facts relative to the full structured collection of facts, an indication of a difference is determined, between what would be the result of the aggregation-type operation on the full structured collection of facts and the actual result of the aggregation-type operation on the sampled subset of facts. The full structured collection of facts may be comprised of a plurality of component structured collections of facts, where the sampled subset of facts includes facts that are sampled from the plurality of component structured collections of facts, in a manner that is deterministic across the component structured collections of facts, and then joined to constitute the sampled subset of facts.

12 Claims, 2 Drawing Sheets

AGGREGATION-SPECIFIC CONFIDENCE INTERVALS FOR FACT SET QUERIES

BACKGROUND

Many enterprises collect large amounts of facts on which they can base business decisions. For example, the facts may be contained in records that are "cookies," created by a browser as a result of particular actions of users with respect to web pages being processed by the browser. The facts may be characteristics of the particular actions such as, for example, which pages of a particular web site a user has visited. While these facts provide much information about the users' behavior, it can be difficult to process so many facts in order to glean the useful information, in order to make a particular business decision.

An "aggregation-type operation" may be performed to distill a large amount of facts (such as the facts contained in cookies) into some aggregate value that represents an aggregate of the large amount of facts, such that a business decision may be made based on the aggregate value. However, when an aggregation-type operation is to be performed on the large amount of facts, it can be computationally prohibitive to process all of the available facts to accomplish the aggregation-type operation. On the other hand, if the aggregation-type operation is performed on a sampling of the facts, it is (conventionally) difficult to know if the outcome is the same (or the same "enough" to be reliable) as would result from performing the aggregation-type operation on all of the available facts.

Furthermore, where the facts on which the aggregation-type operation is to be performed is a result of joining a plurality of fact sets, prior work suggests that the fact sets must be joined prior to any sampling, rather than joining samplings of the fact sets, in order to obtain correct results. For example, the prior work (see, e.g., Chaudhuri et al., "Overcoming Limitations of Sampling for Aggregation Queries," IDCE 2001) suggests that the sample and join operations are not commutative. In other words, the prior work suggests that, because the join of sampled fact sets (sample before join) generally does not produce the same outcome (i.e., the same fact records) as the sample of joined fact sets loin before sample), it is undesirable to use the join of sampled fact sets as a basis for making business decisions. That is, according to the prior work, it is undesirable to perform aggregation-type operations on the join of sampled fact sets and to base business decisions on the outcome of such aggregation-type operations, even though to do so would be more computationally efficient.

SUMMARY

In accordance with an aspect, a method of determining the outcome of performing an aggregation-type operation on facts of a structured collection of facts includes performing an aggregation operation on a subset of facts sampled from the full structured collection of facts, to determine an aggregation result. Based on the determined aggregation result and on an indication of characteristics of the sampled subset of facts relative to the full structured collection of facts, determining an indication of a difference between what would be the result of the aggregation-type operation on the full structured collection of facts and the actual result of the aggregation-type operation on the sampled subset of facts. The full structured collection of facts may be comprised of a plurality of component structured collections of facts, where the sampled subset of facts includes facts that are sampled from the plurality of component structured collections of facts, in a manner that is deterministic across the component structured collections of facts, and then joined to constitute the sampled subset of facts.

DETAILED DESCRIPTION OF THE PREFERRED EMBODIMENTS

The inventors realized that it is not necessarily undesirable to perform aggregation-type operations on the join of sampled fact sets and to base business decisions on the outcome of such aggregation-type operations. Rather, the inventors realized that the row-sets (each row being a record of fact set) from the sample before join approach and from the join before sample approach need not be the same in order to reliably base business decisions on the results of the aggregation-type operation. There is only a requirement that the outcome of particular aggregation-type operations be the same. Even at that, differences can be tolerated, so long as the differences can be quantified or estimated (such as by determining a margin of error associated with the outcome of the aggregation-type operation) and, perhaps, are reliably small. The inventors further realized that, even without a join, it is desirable to quantify the difference between what would be the outcome of the aggregation-type operation on the full fact set and the actual outcome of the aggregation-type operation on the sampled fact set, sampled from the full fact set.

Figure 1:
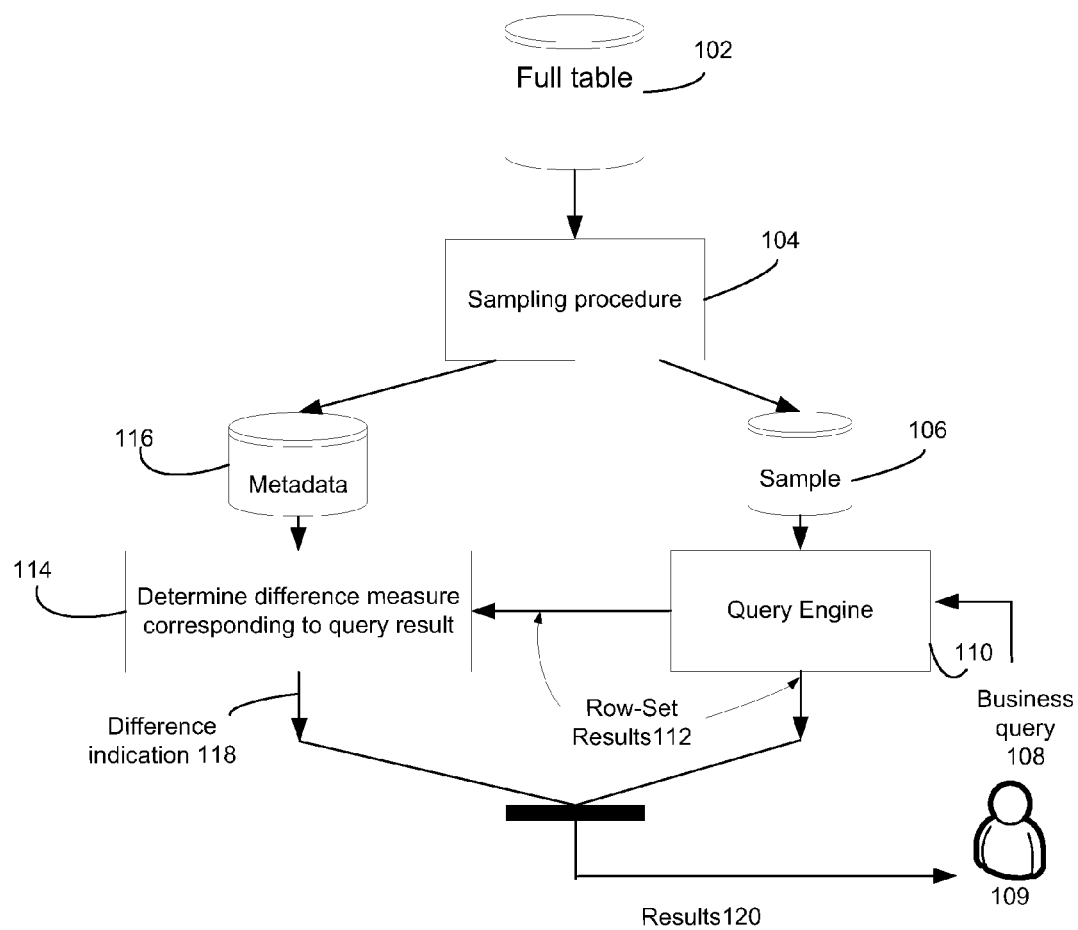
FIG. 1 broadly illustrates data flow through a system in which an aggregation-type operation is performed on facts sampled from a full fact set, and, further, a difference indication is determined.

FIG. 1 broadly illustrates data flow through a system in which an aggregation-type operation is performed on facts sampled from a full fact set, and, further, a difference indication is determined, indicating a difference between what would be the outcome of the aggregation-type operation on the full fact set and on the actual outcome of the aggregation-type operation on the sampled facts.

Turning now to FIG. 1, facts of a structured collection of facts 102 are provided to a sampling procedure 104. A result of the sampling procedure 104 (sampled facts) is held in sample storage 106. Based on a business query 108 (typically from a user 109), a query engine 110 generates a query with respect to the sample 106, and query results 112 are generated. Using the "cookie" example, the structured collection of facts 102 may include a plurality of cookie records, whereas the sampled facts include some of the cookie records.

The query results 112 are provided to processing 114 to determine a difference indication corresponding to the query results 112. As mentioned above, the difference indication indicates a difference between what would be the outcome of the aggregation-type operation on the full facts and on the actual outcome of the aggregation-type operation on the sampled facts. For example, the difference indication may be a statistical estimate or other statistical characteristic of the difference. In addition to being based on the query results 112, the difference indication determination processing 114 is based on metadata 116 regarding the processing by the sampling procedure 104. In one example, the metadata 116 includes information about how the sampling is performed and also includes information about the full facts 102.

The query results 112 and the corresponding difference indication 118 are provided to the user 109 as the results 120 of the business query.

Having broadly described a system in which an aggregation-type operation is performed on sampled facts and, further, in which a difference indication is determined, we now provide an example of more details of the sampling. In particular, FIG. 2 illustrates an example in which the sampled facts are the result of individual sampling fact tables and then joining the samples.

Figure 2:
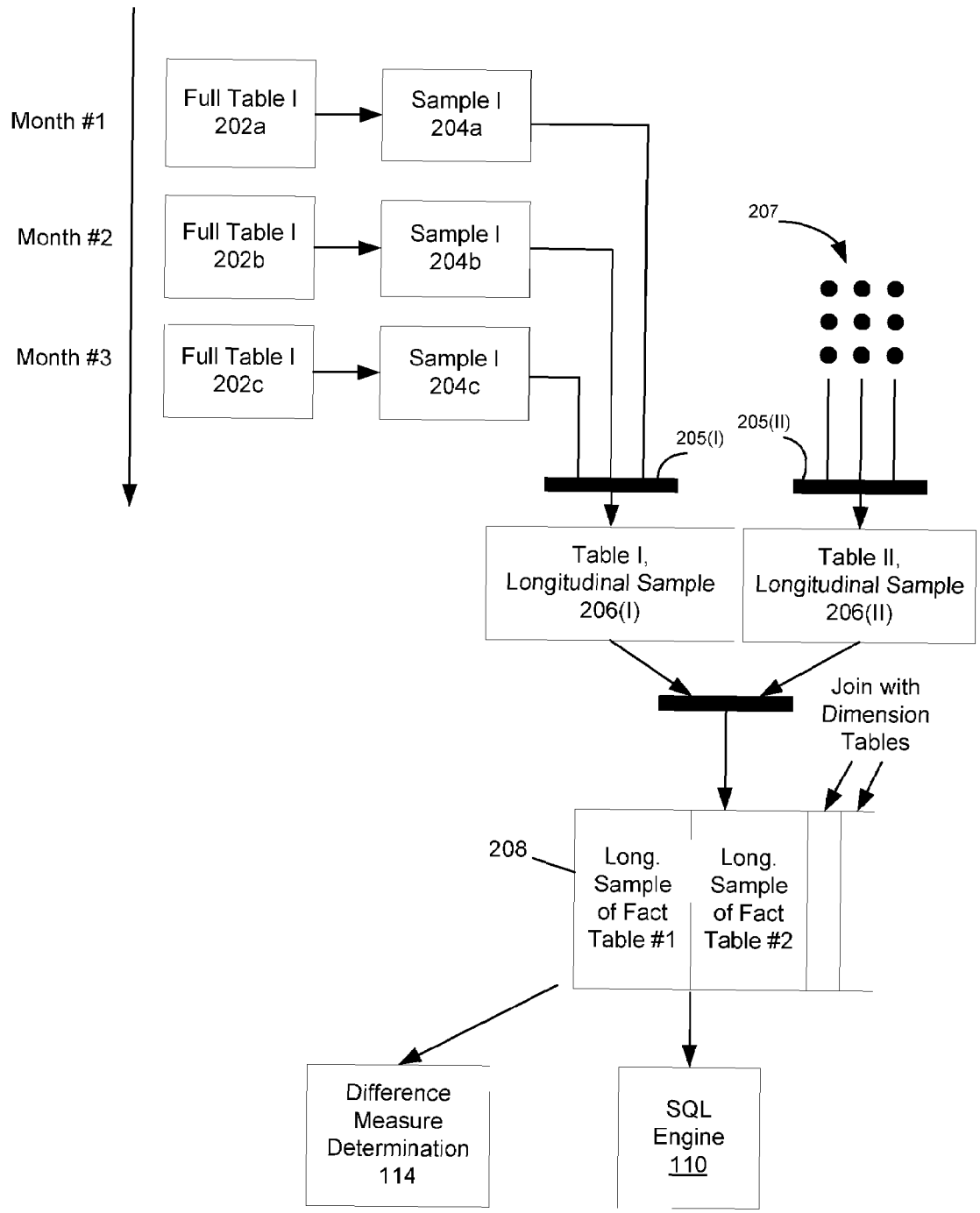
FIG. 2 illustrates an example in which fact tables are individually sampled, and then the samples are joined.

More particularly, FIG. 2 illustrates an example in which fact records are gathered on a month-by-month basis. Referring to FIG. 2, all (i.e., unsampled) facts for Month #1 are stored in Full Fact Table #1 202a, facts for Month #2 are stored in Full Fact Table #2 202b and facts for the current month (Month #3) are stored in Full Fact Table #3 202c. Using the cookie example, Full Fact Table #1 202a may include cookie records generated during Month #1, Full Fact Table #2 202b may include cookie records generated during Month #2, and so on. Meanwhile, the sampled facts for Month #1 (e.g., a sampling of the cookie records generated during Month #1) are stored in Sample Fact Table #1 204a, the sampled facts for Month #2 are stored in Sample Fact Table #2 204b and the sampled facts for Month #3 are stored in Sample Fact Table #3 204c.

Sampling of fact records is with respect to a particular attribute, referenced to herein as an "eminent attribute." For the cookie records, the eminent attribute would typically be a user identification (e.g., a Yahoo! user sign-on identification) that, in each cookie, identifies a user for whom that cookie was generated.

Before continuing with FIG. 2, we discuss how the sampling processing may be performed to, for example, determine the Sample Fact Table 104a from the Full Fact Table 102a. Random sampling is a good way to get what non-statisticians call a "representative" sample of the data. In accordance with one example, by contrast to random sampling, a sampling mechanism has two characteristics.

One characteristic of the example sampling mechanism is determinism, such that if a record having a particular eminent attribute value is included in a sample table determined for one value of a dimension (typically, but not necessarily, time), then a record for that same particular eminent attribute value is also included in a sample table determined for some other value of that same dimension. Using the cookie example, if a cookie generated for a particular user is sampled from the full fact table of Month #1 cookies, then the cookies generated for that particular user are also sampled from the full fact table of Month #2 cookies, etc. In accordance with this characteristic, then, when tables including such samples are joined, a "longitudinal" sample table (i.e., a sample table that is longitudinal across values of the dimension, such as over time) is provided to explore long-term behavior of the units having the particular eminent attribute value (and other users for which records are included in the joined sample tables) over multiple values of the dimension.

Another characteristic of the example sampling mechanism is that the sampling is such that records are not chosen in correlation with the metrics for which it is desired to query the sampled facts. For instance, if the records are cookies (which correspond to users), for a two percent sampling of the cookies, it is desirable to not select the oldest two percent of the cookies. That is, records for the oldest two percent of the cookies may exhibit different behavior than records for newer cookies. Thus, for example, the cookies may be sampled such that the sampling has properties of a random sample.

It is further noted that the sampling is in the "cookie space," not in the page view space. Seemingly innocuous schemes may not result in having properties of a random sample in the cookie space. For example, if it is desired to choose a ten percent sampling of cookies, the sample may be constructed by looking at the page-view event stream and constructing the sample by choosing the cookie that includes an indication of activity corresponding to every tenth page view. This will not yield a sample having random properties in the cookie space, however, since it is more likely to pick cookies for users with higher activity. Thus the resultant sample would be correlated with the metric (amount of activity) to be measured Thus, in one example, the sampling is based on a hashing method to choose which records to include in the sample. The hashing algorithm, for example, may be used to deterministically maps a string representing the eminent attribute to an integer, and when the modulus of the integer (e.g., mod 100) is taken, a substantially uniform distribution of records in the "eminent attribute space" results.

Examples of two hash functions that may be used include the Galileo hash algorithm and the FNV (Fowler/Noll/Vo) hash algorithm. Referring again to cookies as an example, the portion of each cookie that indicates a user identification may be used to map the cookie into one of one million buckets. Then contiguous ranges of those one million buckets may be used to create a sample bucket with size ranging from 0.1% to 10% of the total number of buckets.

The FNV hash may operate by repeatedly multiplying the key (initialized to the first (high) byte of the cookie) by a prime number and XOR'ing the product with the next octet of the data to produce the next key. A third hashing method may be utilized, that simply takes the top 4 bits of the cookie to allocate the cookie to one of 16 buckets. It has been found, in one experiment conducted by the inventor, that the distribution resulting from using the FNV hash is much superior in uniformity than the "top 4 bits" method.

We now turn to FIG. 2, which illustrates how samples of a plurality of sample tables may be joined, such that the resulting sample table may be queried, for example, by the query engine 110 in FIG. 1. FIG. 2 illustrates an example in which fact tables Full Table 202a, 202b and 202c are generated based on activity of users in Month #1 (Full Table 202a), Month #2 (Full Table 202b) and Month #3 (Full Table 202c). Each of the full tables includes substantially all of the samples for the appropriate month, keyed by eminent attribute as described above. Thus, for example, the Full Tables 202 may be considered components of the "full table 102" in FIG. 1.

Sample Tables 204a, 204b and 204c, then, correspond to Full Tables 202a, 202b and 202c. For example, the sample tables are formed using a sampling method described above, such as the FNV hash method. The Sample Tables 204a, 204b and 204c are joined 205(I) to form Table I 206(I), which is a longitudinal sample table of the samples originally from Full Tables 202a, 202b and 202c. The dots 207 signify similar sampling processing taking place on other full tables (not shown), joined 205(II) to form Table II 206(II).

Table I 206(I) and Table II 206(II) are joined to together, with dimension tables (sometimes called lookup or reference tables) to form a Joined Sample Table 208 (e.g., akin to the Sample 106, in FIG. 1) to which queries may be applied (by the Query Engine 110) and for which difference measures may be determined (114) corresponding to the query results.

We now discuss determining the difference measure in some detail, using a specified example of defining a statistical measure of the difference and, more particularly, determining confidence intervals as the difference measure. That is, the business query 108 typically results in an aggregate function query generated by the query engine 110. We use SQL as an example of the query language.

An SQL aggregation query is typically of the form select $A(\vec{c})$ from $\vec{T}$ where C where A is an aggregation function (e.g. sum, count, average), $\vec{c}$ is a vector of columns from one or more tables $\vec{T}$, and C is an arbitrary condition. Aggregation queries can be contrasted from list queries. List queries return rows where each row corresponds to a single value of an eminent attribute. Aggregation queries return rows where each row corresponds to a summary statistic for a set of values of the eminent attribute.

We now discuss a set of aggregation sample-based SQL queries whose mean and confidence intervals can be estimated, and we also discuss formulas and computational procedures for achieving those estimates. The aggregation queries we discuss are of the forms: average, count, countdistinct and sum. Furthermore, the aggregation is over the same key as the sampling key (so if the sampling key is user identification, for example, sums and averages are at the user identification level). Some notable cases are not discussed: the min and max aggregation operators are excluded because sample estimates of these random variables are always biased. The sample estimate for min is always higher than or equal to the true min. The sample estimate for max is always less than or equal to the true (population) max.

The inventors have developed some theory on which formulaic estimates of confidence intervals for various aggregator operators have been developed. The theory is detailed in Appendix A, which comprises a chapter of an unpublished paper, authored by the inventor.

Based on the theory developed by the inventor, for an aggregation SQL query using the various aggregator operators, confidence intervals associated with the result of the SQL query can be estimated. Notice is taken of the Central Limit Theorem (CLT), which states that, for n random variables with arbitrary distribution (the distribution does not have to be a normal distribution) but with finite variance, if the mean is taken of the n variables, the distribution of the mean tends to normality as n tends to infinity.

We now discuss particular aggregator operators specifically. Turning now to the average aggregator, based on the theory developed by the inventors, for an aggregation SQL query using the "average" aggregator select average (M) from T, the 95% confidence interval can be estimated by $$CI_{95\%}(M_n) \approx \left[m - 1.96 \frac{s}{\sqrt{n}}, m + 1.96 \frac{s}{\sqrt{n}}\right]$$

where T is a sample table, M is a numeric column in T, $M_n$ is the random variable representing "average(M)" using n rows, n is the number of rows returned by the SQL query, m is the average value of M over those n rows, and s is the sample standard-deviation of M over the same row-set. In addition, the following assumptions are made: all rows (e.g., cookies) are independent, all rows are identically distributed, the number of rows, n, is large enough such that a Central Limit Theorem (CLT) applies, and the population from which T is sampled is infinite.

It is noted that the confidence interval is a function of quantities (n; m; s) that can all be easily calculated in most business-intelligence tools such as Access, Microstrategy, SAS, MyNA and Excel. The confidence interval estimate may be adjusted for a non-infinite population, using a "finite population correction," or FPC. A "sampling fraction" $f$ is determined from $$\frac{n}{N},$$

where N is the size of the finite population and n is the sample size. With the FPC, the 95% confidence interval for the average aggregator can be estimated by $$CI_{N,95\%}(M_n) \approx \left[m - 1.96 \frac{s}{\sqrt{n}}\sqrt{1-f}, m + 1.96 \frac{s}{\sqrt{n}}\sqrt{1-f}\right]$$

The confidence interval has the property that variance and confidence interval width go to zero as the sampling fractions, $f$, goes to 1. This is reasonable, since with $f$ close to 1, almost the entire (finite) population is being sampled, and the uncertainty (as reflected in the confidence interval width) should go down to zero.

Turning now to the sum aggregator, based on the theory developed by the inventors, for an aggregation SQL query using the "sum" aggregator, the 95% confidence interval can be estimated by $$CI_{95\%}(S_n) \approx [nm - 1.96s\sqrt{n}, nm + 1.96s\sqrt{n}]$$

With the FPC, the 95% confidence interval for the sum aggregator can be estimated by $$CI_{N,95\%}(S_n) \approx [nm - 1.96s\sqrt{n(1-f)}, nm + 1.96s\sqrt{n(1-f)}]$$

The confidence interval just described, for the sum aggregator, is for a sum over the n items in the sample. For example, the confidence interval may be estimated for a sum of pageviews of all cookies in a sample for visits to a particular property. However, analysts are typically also interested in projecting (scaling) these numbers to the 100% scale. For instance, if a 5% sample were used, it would be desired to multiply the expectation by 20 to get an estimate at the 100% scale. Based on theory developed by the inventors, the confidence interval for such scaling becomes (after applying FPC)

$$CI_{N,95\%}\left(\frac{1}{f}S_N\right) \approx \left[\frac{1}{f}nm - 1.96s\sqrt{\frac{1}{f}n(1-f)}, \frac{1}{f}nm + 1.96s\sqrt{\frac{1}{f}n(1-f)}\right]$$

We now discuss various "count" aggregation operations and the corresponding confidence interval estimates. For example, the conditional count aggregation operation is modeled by a binomial treatment. The binomial model only has a single parameter p denoting the proportion of units satisfying the condition C. Let $B_p$ be a binomially distributed random variable representing the number of items under condition C with proportion p and let $B_{n,p}$ be its counterpart for sample size n. Applying the FPC, the normal approximation to the confidence interval is $$CI_{N,95\%}\left(B_{\frac{1}{f}n}\right) \approx \left[\frac{1}{f}np - 1.96\sqrt{\frac{1}{f}(1-f)np(1-p)},\right.$$

$$\frac{1}{f}np + 1.96\sqrt{\frac{1}{f}(1-f)np(1-p)}\ \Bigg]$$

While the formula looks complicated, it is a function of only three commonly available numbers: the sampling fraction f which is typically known ahead of time, of the sample size n, and of the selectivity p of the condition C. The selectivity is just the fraction of rows satisfying C from the number of rows n in the sample. To compute the selectivity, one simply divides the number of rows (in the sample) satisfying C (which would include definition of the groups if any) by the total number of rows in the sample.

An unconditional count aggregation operation, if a value for the total number of rows N in the parent table is not available, can be estimated by $$CI_{N,95\%}\left(\frac{1}{f}C\right) \approx [n - 1.96(1-f)\sqrt{n}, n + 1.96(1-f)\sqrt{n}]$$

where C is a random variable representing the count produced in the query and n is the number of cookies in the sample. It is noted that CI, in this case, is centered on the sample size n, which is expected since the query requests the number of units in the sample.

We now discuss a population ratio aggregation operation. It is assumed that $C_i$ is N random variables representing quantities in the numerator of the ratio. $Q_i$ is N random variables representing quantities in the denominator of the ratio. b is the sample size. The population ratio is $$R = \frac{C}{Q}$$

and an estimate of the ratio is estimated by the sample estimator, which is the sample number of quantities in the numerator divided by the sample number of quantities in the denominator $$\hat{R} = \frac{c_n}{q_n}$$

The 95% confidence interval of the proportion estimator is $$CI_{n,95}(\hat{R}) \approx \frac{c_n}{q_n} \pm 1.96 \times \frac{1}{Q}\sqrt{\frac{1-f}{n}\frac{1}{n-1}\sum_b^n (c_b - \hat{R}q_b)^2}\ .$$

For a percentage change aggregator D (i.e., determining the fractional change in a random variable X between time $t_0$ and time $t_1$), the 95% confidence interval of the percentage change estimator is $$CI_{n,95}(\hat{D}) \approx \left(1 - \frac{\bar{x}_1}{\bar{x}_0}\right) \pm 1.96 \times \frac{1}{\bar{x}_0}\sqrt{\frac{1-f}{n}\frac{1}{n-1}\sum_b^n \left(x_{b,1} - \frac{\bar{x}_1}{\bar{x}_0}x_{b,0}\right)^2}$$

where n is the set of records formed by the union of records at time intervals $t_0$ and time $t_1$, $\bar{x}_0$ is the sample mean of $X_0$ and $\bar{x}_1$ for $\bar{x}_1$. $\bar{x}_{b,j}$ is the value in the record at time i.

We have thus described a method and computer program product in which an aggregation-type operation may be performed on a subset of facts sampled from a full structured collection of facts, to determine an aggregation result. Differences between performing aggregation operations on the sampled fact set and on the full structured collection of facts are quantified or estimated (such as by determining a margin of error associated with the outcome of the aggregation-type operation).

Furthermore, the full structured collection of facts may be comprised of a plurality of component structured collections of facts. The sampled subset of facts may include facts that are sampled from the plurality of component structured collections of facts, in a manner that is deterministic across the component structured collections of facts, and then joined to constitute the sampled subset of facts. That is, the "sample" operation may be before the "join" and reliable results of an aggregation-type operation may nevertheless be obtained. In addition, it is noted that the methods described herein may be executed by a computing system according to computer program instructions tangibly embodied in a computer-readable medium, wherein the computer program instructions, when executed by the computing system, are operable to cause at least one computing device of the computing system to perform the method.

What is claimed is:

1. A computer-implemented method of determining the outcome of performing an aggregation-type operation on facts contained in a full structured collection of fact records, wherein the full structured collection of fact records is comprised of a plurality of component structured collections of fact records, the facts being data representative of interaction by users with information presented to the users via a computing network and each component structured collection of facts being for facts indicating user interaction during a particular time period the method comprising:

by a computing system, sampling the plurality of component structured collections of fact records in a deterministic manner across the component structured collections of facts, wherein the sampling includes applying a sampling algorithm to values of a particular eminent attribute of the fact records consistently across the component structured collections of fact records, wherein the algorithm is characterized by deterministically distributing the fact records relative to the eminent attribute, the particular eminent attribute being a dimension of every one of the component structured collections of fact records, by the computing system, forming a merged collection of sampled fact records comprising the fact records sampled from the plurality of component structured collections of fact records, such that the merged collection of sampled fact records is longitudinal for records having the at least one particular eminent attribute value, over multiple time periods;

by the computing system, performing an aggregation operation on the merged collection of sampled fact records to determine an aggregation result, the aggregation operates at a same level as the particular eminent attribute value and the aggregation result being an aggregate value representing an aggreate of the facts of the merged collection of sampled fact records; and by the computing system, based on the determined aggregation result and on an indication of characteristics of facts of the sampled fact records relative to the facts of the full structured collection of fact records, determining an indication of a statistical measure of a difference between what would be the result of the aggregation-type operation on the facts of the full structured collection of fact records and the actual result of the aggregation-type operation on facts of the sampled fact records, wherein the indication of the statistical measure of the difference indicates a confidence associated with the result of the aggregation-type operation on the sampled subset of facts.

2. The method of claim 1, wherein:

the indication of confidence is an indication of a confidence interval associated with the result of the aggregation-type operation on the sampled subset of facts.

3. The method of claim 1, wherein: applying the sampling algorithm includes applying a hashing algorithm to values of a particular eminent attribute of the fact records consistently across every one of the component structured collections of fact records.

4. The method of claim 1, wherein:

deterministically distributing the fact records relative to the eminent attribute includes distributing the fact records in a manner that has properties of a random distribution, relative to the eminent attribute.

5. A computing system configured to determine the outcome of performing an aggregation-type operation on facts contained in a full structured collection of fact records, wherein the full structured collection of fact records is comprised of a plurality of component structured collections of fact records, the facts being data representative of interaction by users with information presented to the users via a computing network and each component structured collection of facts being for facts indicating user interaction during a particular in a time period, the computing system configured to perform the method comprising:

by the computing system, sampling the plurality of component structured collections of fact records in a deterministic manner across the component structured collections of facts, wherein the sampling includes applying a sampling algorithm to values of a particular eminent attribute of the fact records consistently across the component structured collections of fact records, wherein the algorithm is characterized by deterministically distributing the fact records relative to the eminent attribute, the particular eminent attribute being a dimension of every one of the component structured collections of fact records, by the computing system, forming a merged collection of sampled fact records comprising the fact records sampled from the plurality of component structured collections of fact records, such that the merged collection of sampled fact records is longitudinal for records having the at least one particular eminent attribute value, over multiple time periods;

by the computing system, performing an aggregation operation on the merged collection of sampled fact records to determine an aggregation result, the aggregation operates at a same level as the particular eminent attribute value and the aggregation result being an aggregate value representing an aggregate of the facts of the merged collection of sampled fact records; and by the computing system, based on the determined aggregation result and on an indication of characteristics of facts of the sampled fact records relative to the facts of the full structured collection of fact records, determining an indication of a statistical measure of a difference between what would be the result of the aggregation-type operation on the facts of the full structured collection of fact records and the actual result of the aggregation-type operation on facts of the sampled fact records, wherein the indication of the statistical measure of the difference indicates a confidence associated with the result of the aggregation-type operation on the sampled subset of facts.

6. The computing system of claim 5, wherein:

the statistical measure of the difference indicates a confidence interval associated with the result of the aggregation-type operation on the sampled subset of facts.

7. The computing system of claim 5, wherein:

applying the sampling algorithm includes applying a hashing algorithm to values of a particular eminent attribute of the fact records consistently across every one of the component structured collections of fact records.

8. The computer program product of claim 5, wherein:

deterministically distributing the fact records relative to the eminent attribute includes distributing the fact records in a manner that has properties of a random distribution, relative to the eminent attribute.

9. A computer program product for determining the outcome of performing an aggregation-type operation on facts contained in a full structured collection of fact records, wherein the full structured collection of fact records is comprised of a plurality of component structured collections of fact records, the facts being data representative of interaction by users with information presented to the users via a computing network and each component structured collection of facts being for facts indicating user interaction at a particular in a time period, the computer program product comprising at least one computer-readable medium having computer program instructions stored therein which are operable to cause at least one computing device to:

sample the plurality of component structured collections of fact records in a deterministic manner across the component structured collections of facts, wherein the sampling includes applying a sampling algorithm to values of a particular eminent attribute of the fact records consistently across the component structured collections of fact records, wherein the algorithm is characterized by deterministically distributing the fact records relative to the eminent attribute, the particular eminent attribute being a dimension of every one of the component structured collections of fact records, form a merged collection of sampled fact records comprising the fact records sampled from the plurality of component structured collections of fact records, such that the merged collection of sampled fact records is longitudinal for records having the at least one particular eminent attribute value, over multiple time periods;

perform an aggregation operation on the merged collection of sampled fact records to determine an aggregation result, the aggregation operates at a same level as the particular eminent attribute value and the aggregation result being an aggregate value representing an aggregate of the facts of the merged collection of sampled fact records; and based on the determined aggregation result and on an indication of characteristics of facts of the sampled fact records relative to the facts of the full structured collection of fact records, determine an indication of a statistical measure of a difference between what would be the result of the aggregation-type operation on the facts of the full structured collection of fact records and the actual result of the aggregation-type operation on facts of the sampled fact records, wherein the indication of the statistical measure of the difference indicates a confidence associated with the result of the aggregation-type operation on the sampled subset of facts.

10. The computer program product of claim 9, wherein:
the statistical measure of the difference indicates a confidence interval associated with the result of the aggregation-type operation on the sampled subset of facts.

11. The computer program product of claim 9, wherein:
applying the sampling algorithm includes applying a hashing algorithm to values of a particular eminent attribute of the fact records consistently across every one of the component structured collections of fact records.

12. The computer program product of claim 9, wherein:
deterministically distributing the fact records relative to the eminent attribute includes distributing the fact records in a manner that has properties of a random distribution, relative to the eminent attribute.

* * * * *